United States Patent
Vitou et al.

(10) Patent No.: US 10,228,025 B2
(45) Date of Patent: Mar. 12, 2019

(54) SLEEVE COUPLING WITH FLANGE HAVING INTERNAL TOOTH DESIGN FOR INCREASING USEFUL LIFE OF FLEXIBLE INSERT

(71) Applicant: ABB Schweiz AG, Zurich (CH)

(72) Inventors: Alexander B. Vitou, Greenville, SC (US); Michael E. Konruff, Simpsonville, SC (US)

(73) Assignee: ABB Schweiz AG, Zurich (CH)

( * ) Notice: Subject to any disclaimer, the term of this patent is extended or adjusted under 35 U.S.C. 154(b) by 150 days.

(21) Appl. No.: 15/205,675

(22) Filed: Jul. 8, 2016

(65) Prior Publication Data
US 2018/0010646 A1  Jan. 11, 2018

(51) Int. Cl.
F16D 3/72  (2006.01)

(52) U.S. Cl.
CPC .................................. *F16D 3/72* (2013.01)

(58) Field of Classification Search
CPC .................................................. F16D 3/72
USPC ....................................... 464/75, 88
See application file for complete search history.

(56) References Cited

U.S. PATENT DOCUMENTS

| | | | | |
|---|---|---|---|---|
| 3,788,098 A | * | 1/1974 | Miller | F16D 3/74 |
| | | | | 464/88 |
| 4,240,763 A | * | 12/1980 | Moore | F16C 3/02 |
| | | | | 464/75 |
| 4,493,407 A | * | 1/1985 | Newton | F16D 13/686 |
| | | | | 464/75 |
| 5,006,007 A | | 4/1991 | Fischer et al. | |
| 5,660,591 A | | 8/1997 | Reynolds | |
| 5,910,049 A | | 6/1999 | DeWachter et al. | |
| 5,911,629 A | | 6/1999 | Reynolds | |
| 5,951,198 A | | 9/1999 | Phillips | |
| 6,054,788 A | | 4/2000 | Dombrovski et al. | |
| 6,599,052 B1 | | 7/2003 | Phillips | |
| 6,918,835 B2 | * | 7/2005 | Aoki | F16D 9/00 |
| | | | | 464/76 |
| 7,217,193 B2 | | 5/2007 | Nisley | |

(Continued)

FOREIGN PATENT DOCUMENTS

| | | | | |
|---|---|---|---|---|
| GB | 207400 | * | 11/1923 | ........... 464/88 |
| GB | 216241 | * | 5/1924 | ........... 464/88 |

OTHER PUBLICATIONS

Dodge PT Components Engineering Catalog, 2015, Baldor Electric Company, 101 pages.

*Primary Examiner* — Greg Binda
(74) *Attorney, Agent, or Firm* — Leydig, Voit & Mayer, Ltd.

(57) ABSTRACT

A flexible coupling assembly for connecting two shafts in a coaxial alignment has a flange including a hub with axially opposite first and second ends and a plurality of radial grooves angularly spaced about a periphery of the hub. The radial grooves have crests and roots. The radial grooves extend axially along a length of the hub and are shaped in a manner such that a diameter of the crests at a position on the hub adjacent to the first axial end of the hub is greater than a diameter of the crests at a position of the hub adjacent to the second axial end. The coupling includes a flexible insert comprising a resilient member having an inner surface and an outer surface. The flexible insert inner surface has a plurality of notches adapted to cooperate with the flange hub radial grooves.

20 Claims, 9 Drawing Sheets

(56) References Cited

U.S. PATENT DOCUMENTS

| | | |
|---|---|---|
| 7,544,130 B2 | 6/2009 | Nisley |
| 8,758,149 B1 | 6/2014 | Hewitt et al. |
| 9,249,837 B2 | 2/2016 | Hewitt et al. |
| 2005/0239558 A1 | 10/2005 | Brandt et al. |
| 2007/0295153 A1 | 12/2007 | Burdeshaw |
| 2011/0130209 A1 | 6/2011 | LaFevre |

* cited by examiner

SLEEVE COUPLING WITH FLANGE HAVING INTERNAL TOOTH DESIGN FOR INCREASING USEFUL LIFE OF FLEXIBLE INSERT

SUMMARY

This disclosure is directed to a sleeve coupling. In particular, the sleeve coupling includes a flange having an internal tooth design that increases the useful life of the flexible insert. The flanges of the sleeve coupling may be made from a sintered powder metal material. The flange internal tooth design also increases the manufacturability of the flange.

DETAILED DESCRIPTION

Figure 1:
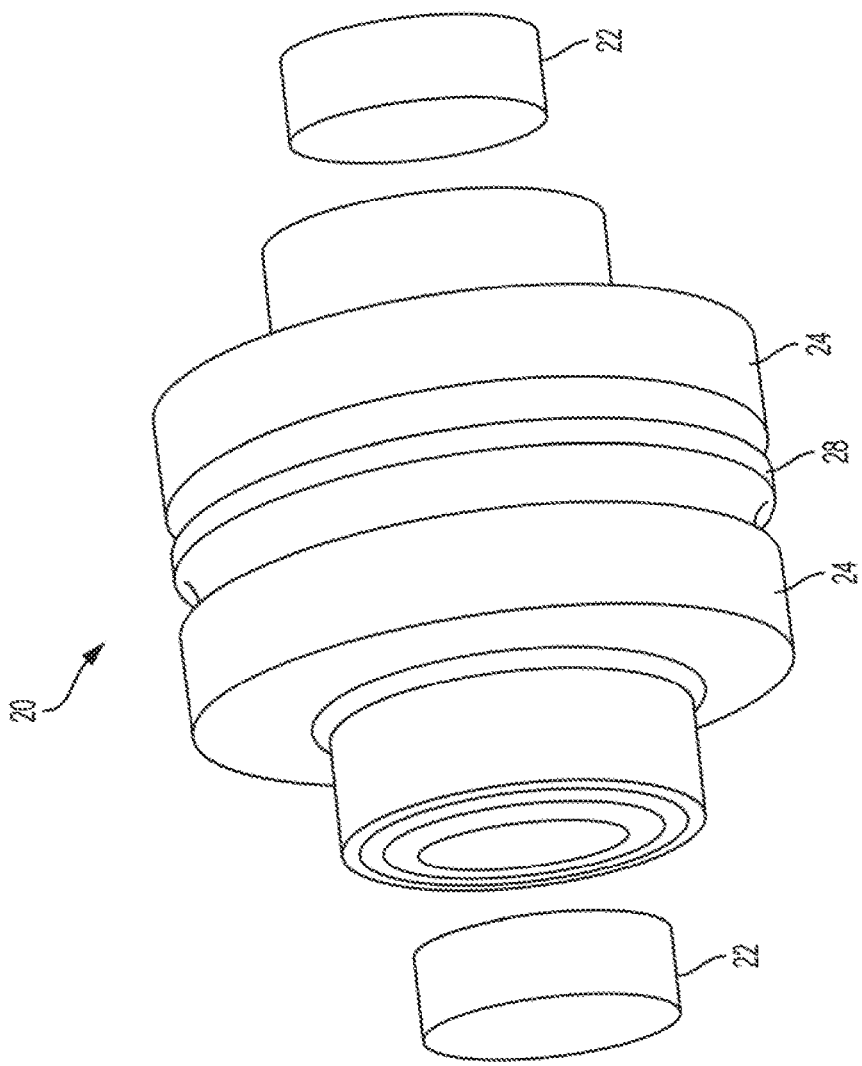
FIG. 1 is a perspective view of a sleeve coupling, including opposite flanges and a flexible insert disposed between the flanges.

FIG. 1 shows a sleeve coupling assembly 20 used to connect two shaft ends 22 together in a co-axial alignment, enabling torque to be transferred from one shaft to another while allowing for misalignment of the shafts. The coupling assembly 20 comprises two flanges 24 and a flexible insert 26. Each flange 24 is configured to be operatively connected to an end of one of the shafts 22. The flange 24 may have an interior 26 and the flexible insert 28 may be placed in the interior between both flanges. A portion of the flexible insert 28 between the opposite flanges may form an exterior of the coupling assembly 20. It should be appreciated that the flexible coupling assembly may be provided as a kit comprising the flexible insert, the flanges, and mechanical fasteners to mount the flanges on the shaft. In the kit or as part of the flexible coupling assembly, a band (not shown) may be provided for wrapping around the elastomeric element outer diameter between the flanges. Also, in the kit or as part of the flexible coupling assembly, shaft hubs (not shown) may be provided to serve as an interface between the flanges and the shafts.

The flanges 24 may be made from a sintered powder metal material. The sintered powder metal material is generally less expensive than traditional cast metals and allows manufacture of the flanges using punch press processes instead of machining. The flange designs described herein avoid numerous and sometimes complex punch levels, and promote increased useful life of the flexible element. As will become evident from the discussion that follows, the flange designs described herein reduce wear of the flexible insert and stress concentration points which otherwise contribute to lower useful life of the flexible insert and coupling.

Referring to FIGS. 2-10, the flange (24a in FIGS. 2-4, 24b in FIGS. 5-7, and 24c in FIGS. 8-10) has first and second sides 30, 32. The first side 30 is generally oriented toward the flexible element 28 and an interior 34 of the coupling assembly 20, and the second side 32 is generally oriented toward the shafts and an exterior of the coupling assembly. The flange has a center axis 36 with a concentrically aligned outer diameter surface 38 that forms a portion of the exterior of the flange, and a concentrically aligned center bore 40 which may be sized to accommodate the shaft 22. On the interior 26 of the flange, a center hub (42a in FIGS. 2-4, 42b in FIGS. 5-7, and 42c in FIGS. 8-10) is provided concentrically aligned with the center axis 36. The center hub extends axially inward into the interior 34 of the coupling assembly 20 and has an axial inward face 44 that defines a plane perpendicular to the flange center axis 36. The flange interior 26 has an outer bore wall 46 circumjacent to the center hub. The outer bore wall 46 is spaced from the flange outer diameter surface 38 and forms an axial flat 48 arranged in a plane perpendicular to the flange center axis 36 that extends radially inward from the outer diameter surface of the flange to the outer bore wall. The outer bore wall 46 extends axially into the flange to an internal face 50. The internal face 50 is formed generally in a plane perpendicular to the flange center axis 36. In the radial direction, the axial flat 48 is spaced from the center hub by the internal face 50. Together, the outer bore wall 46, internal face 50, and center hub define the interior 26 of the flange. When the coupling assembly is assembled, the flexible element 28 may be in part disposed in the interior 26 of the flange and may abut the internal face 50. The outer bore wall 46 may have a plurality of radial projecting grooves 52 extending axially from the internal face 50 to the axial flat 48. The outer bore wall grooves 52 may be equiangularly spaced about the outer bore wall. While the drawings show an outer diameter surface of the flange, an axial flat, and outer bore wall, one or more of the aforementioned elements may be omitted.

The center hub (42a in FIGS. 2-4, 42b in FIGS. 5-7, and 42c in FIGS. 8-10) may have a plurality of radially projecting grooves 54 extending axially along an axial length of the center hub. The grooves 54 may be equiangularly spaced about the center hub. The center hub radial grooves 54 may extend radially between crests 56 and roots 58. The grooves 54 may be formed on the center hub at a position adjacent to the internal face 50. The internal face 50 may be formed with a relief or undercut 60 at the conterminous edge of the center hub and the internal face. In addition to or in the alternative, the grooves 54 may be formed on the center hub at a slight distance from the internal face 50 so as to provide the relief or undercut 60 at the conterminous edge of the center hub and the internal face.

Figure 11:
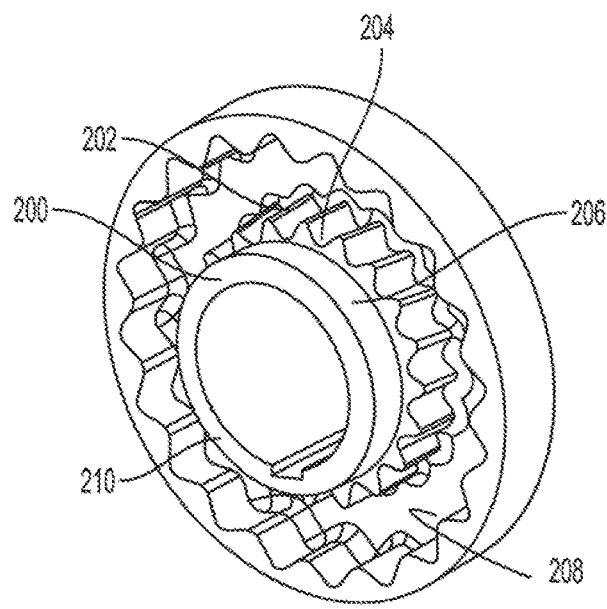
FIG. 11 is a perspective view of a flange of a sleeve coupling having a conventional tooth design.
Figure 12:
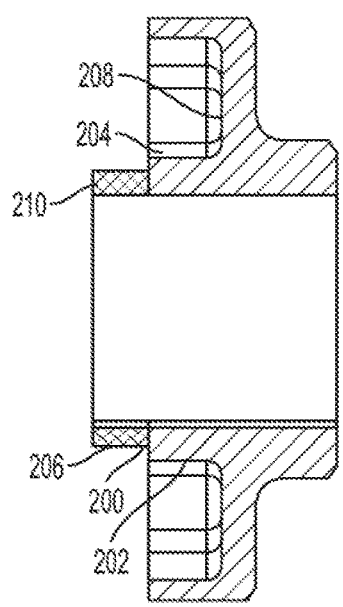
FIG. 12 is a cross-sectional view of the flange of FIG. 11.

As shown in FIGS. 11-12, the center hub 200 has a first portion 202 with grooves 204 and a second, stepped-down diameter portion 206 that is un-grooved and axially inward of the first portion. Thus, in FIGS. 11-12, the center hub radial grooves 204 extend axially from a position adjacent to an internal face 208 of the flange to the second, stepped-down diameter un-grooved portion 206. The second, stepped-down diameter un-grooved portion 206 extends axially to an axial inward face 210 of the flange. The second, stepped down diameter, un-grooved portion 206 can provide stress concentration points because of its corners and included angles. The second, stepped down diameter, un-grooved portion 206 also tends to create more complex punch operations.

In FIGS. 2-10, the center hub is shaped in a different manner and does not include the second, stepped-down diameter, un-grooved portion of FIGS. 11-12. In FIGS. 2-10, the grooves 54 extend axially from a position adjacent to the internal face 50 to a position adjacent to the axial inward face 44 of the center hub. In FIGS. 2-10, to eliminate a stress concentration point, the grooves 54 may be significantly tapered toward and/or have a smooth transition to the axial inward face 44. In one aspect, the crests 56 and roots 58 may converge at a position adjacent to the axial inward face and may be rounded. The crests 56 may define a diameter of the hub along an axial length of the hub. In FIGS. 2-10, a diameter of the crests at a position on the center hub adjacent to the internal face 50 may be greater than a diameter of the crests at a position on the center hub adjacent to the axial inward face 44 of the center hub.

Figure 2:
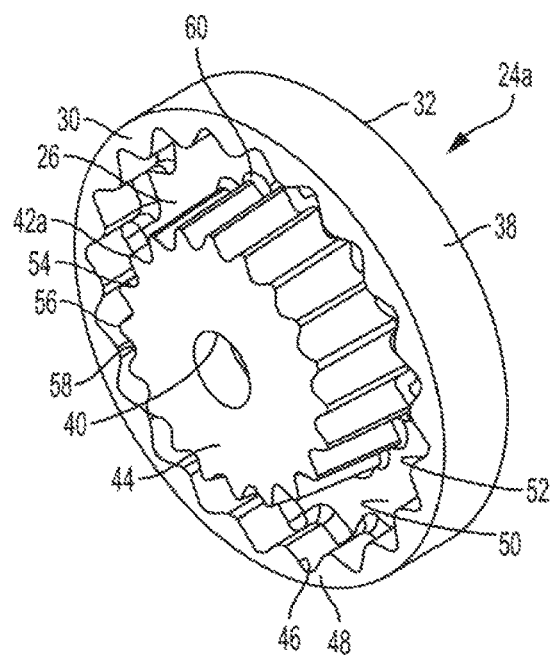
FIG. 2 is a perspective view of a flange showing one embodiment of an internal tooth design.
Figure 3:
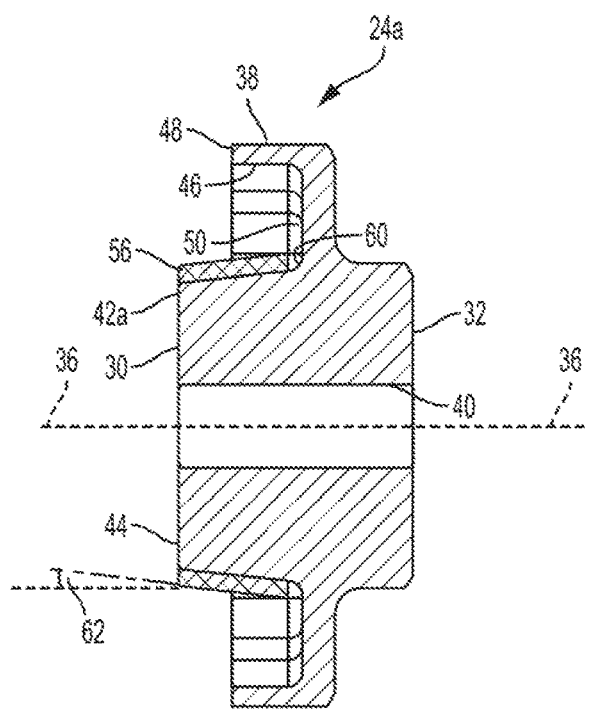
FIG. 3 is a cross-sectional view of the flange of FIG. 2.
Figure 4:
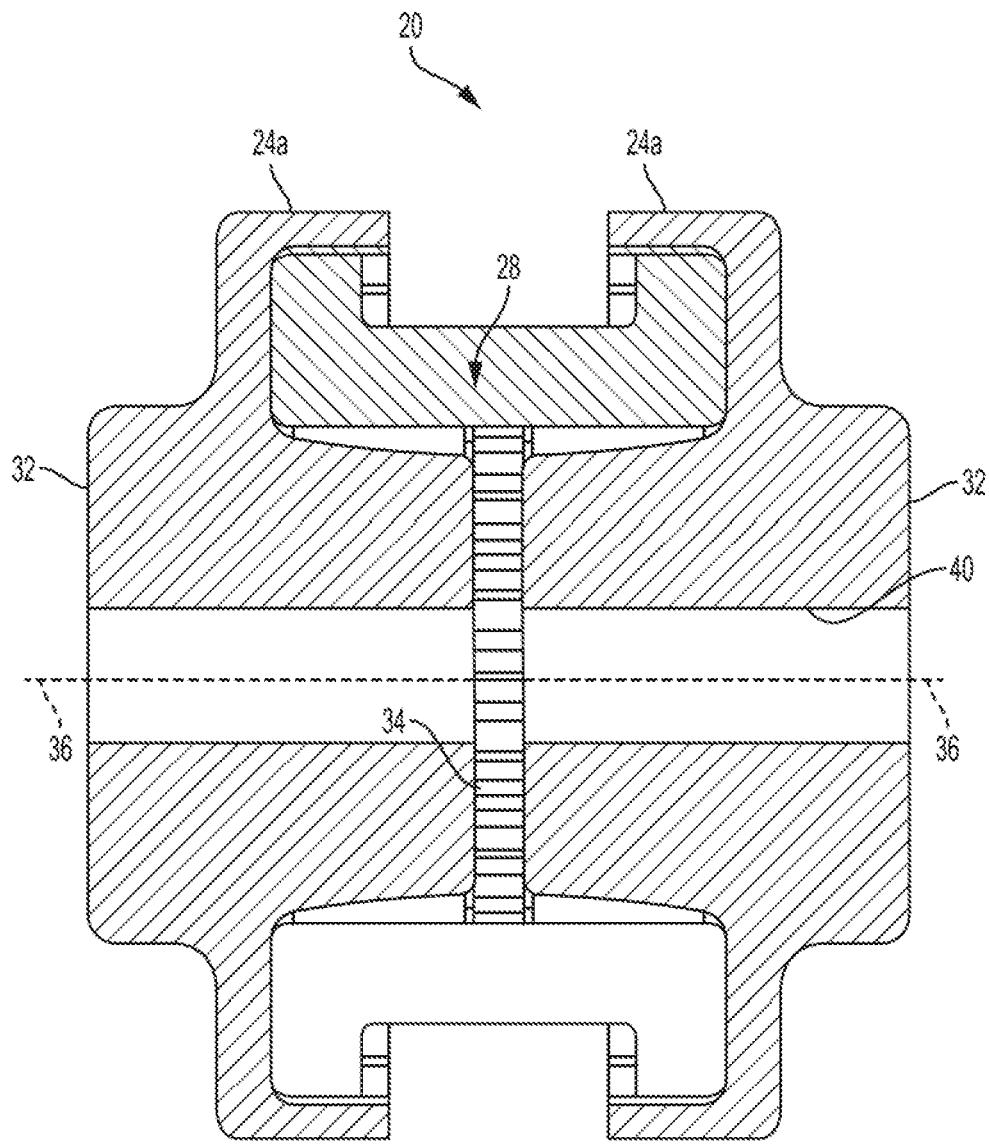
FIG. 4 is a cross-sectional view of a flexible coupling assembly with the flange of FIG. 2.
Figure 5:
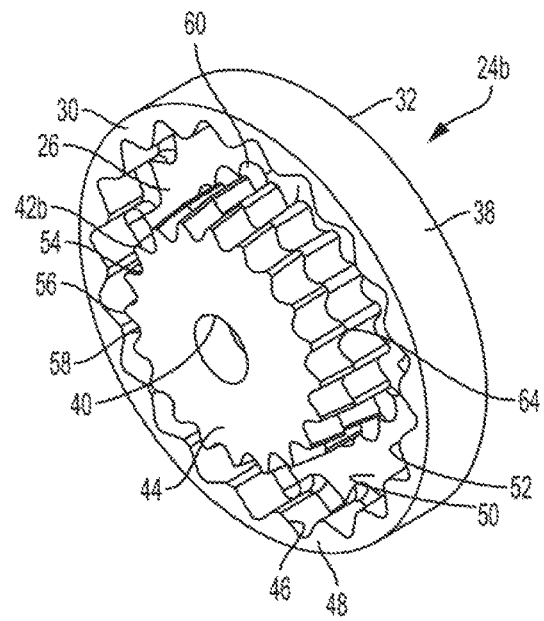
FIG. 5 is a perspective view of a flange showing another embodiment of an internal tooth design.
Figure 6:
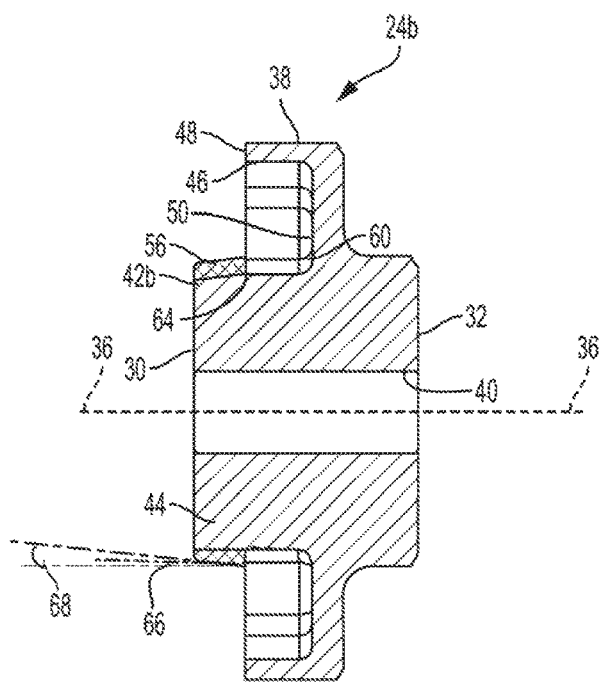
FIG. 6 is a cross-sectional view of the flange of FIG. 5.
Figure 7:
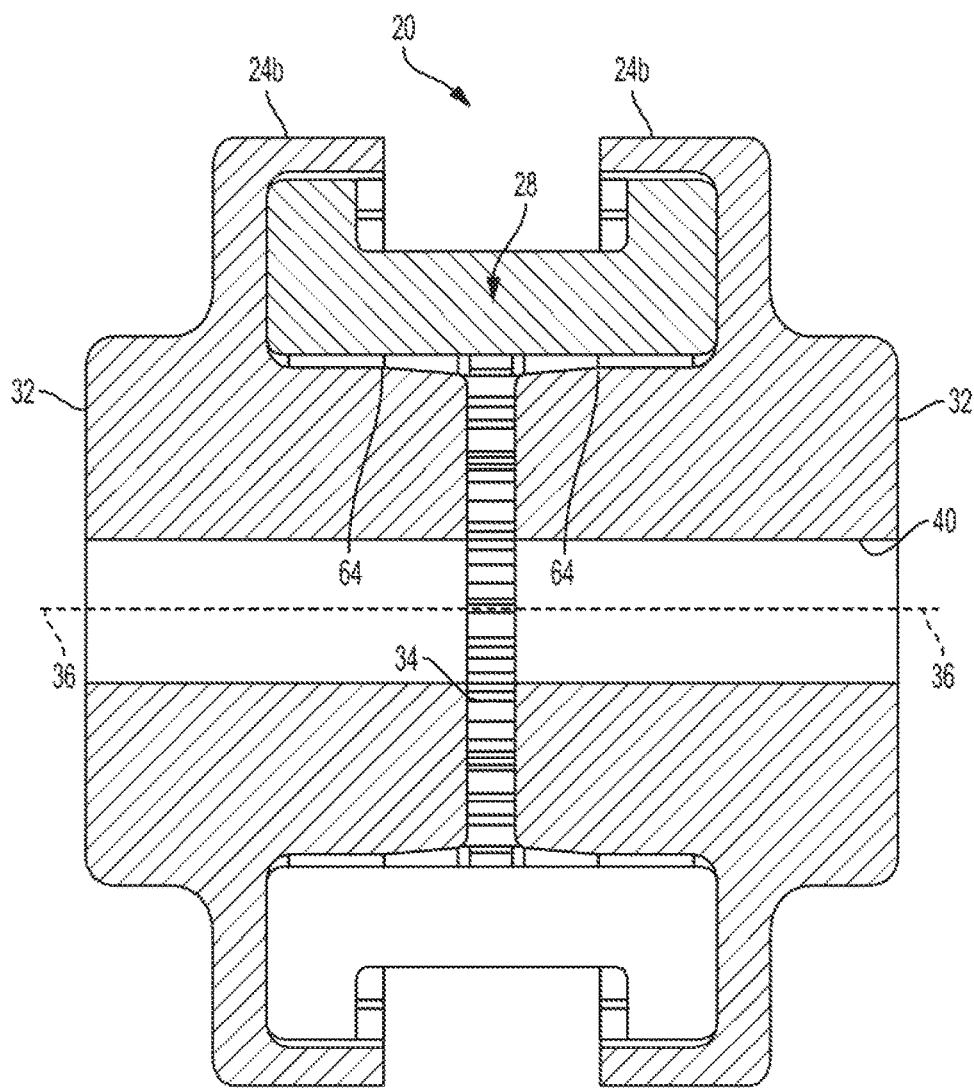
FIG. 7 is a cross-sectional view of a flexible coupling assembly with the flange of FIG. 5.

In one aspect, for instance, the embodiment of the flange 24*a* as shown in FIGS. 2-4, the center hub 42*a* has its radial grooves 54 formed with a taper angle 62. The taper angle 62 may be constant from a position on the hub adjacent to the internal face 50 to a position on the hub adjacent to the axial inward face 44. The taper angle 62 may be significantly more than the angles typically used in connection with punch press operations. For instance, surfaces may be formed with an angle of about 1/2 degrees in punch press operations to provide the necessary clearance and draft between the punch and the mold. In the example shown in FIGS. 2-4, the taper angle 62 may be increased to about 5 degrees. This eliminates stress concentration points found in the second, stepped-down diameter un-grooved portion 206 design of FIGS. 11-12. The taper also contributes to simpler punch press operations compared to the second, stepped-down diameter un-grooved portion 206 design of FIGS. 11-12. In one aspect, the diameter of the crests 56 of the grooves 54 on the hub 42*a* may change at a constant rate from a position on the hub adjacent to the internal face 50 to a position on the hub adjacent to the axial inward face 44.

Figure 8:
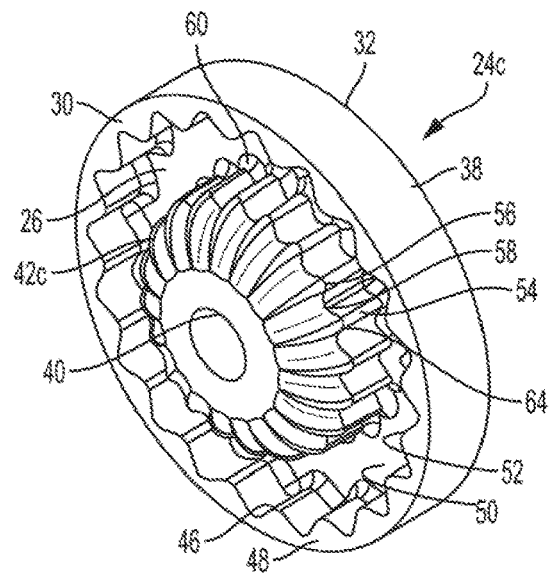
FIG. 8 is a perspective view of a flange showing another embodiment of an internal tooth design.
Figure 9:
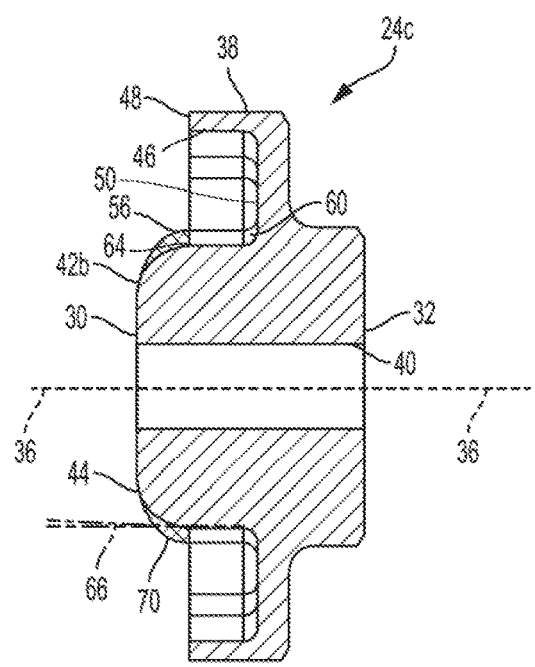
FIG. 9 is a cross-sectional view of the flange of FIG. 8.
Figure 10:
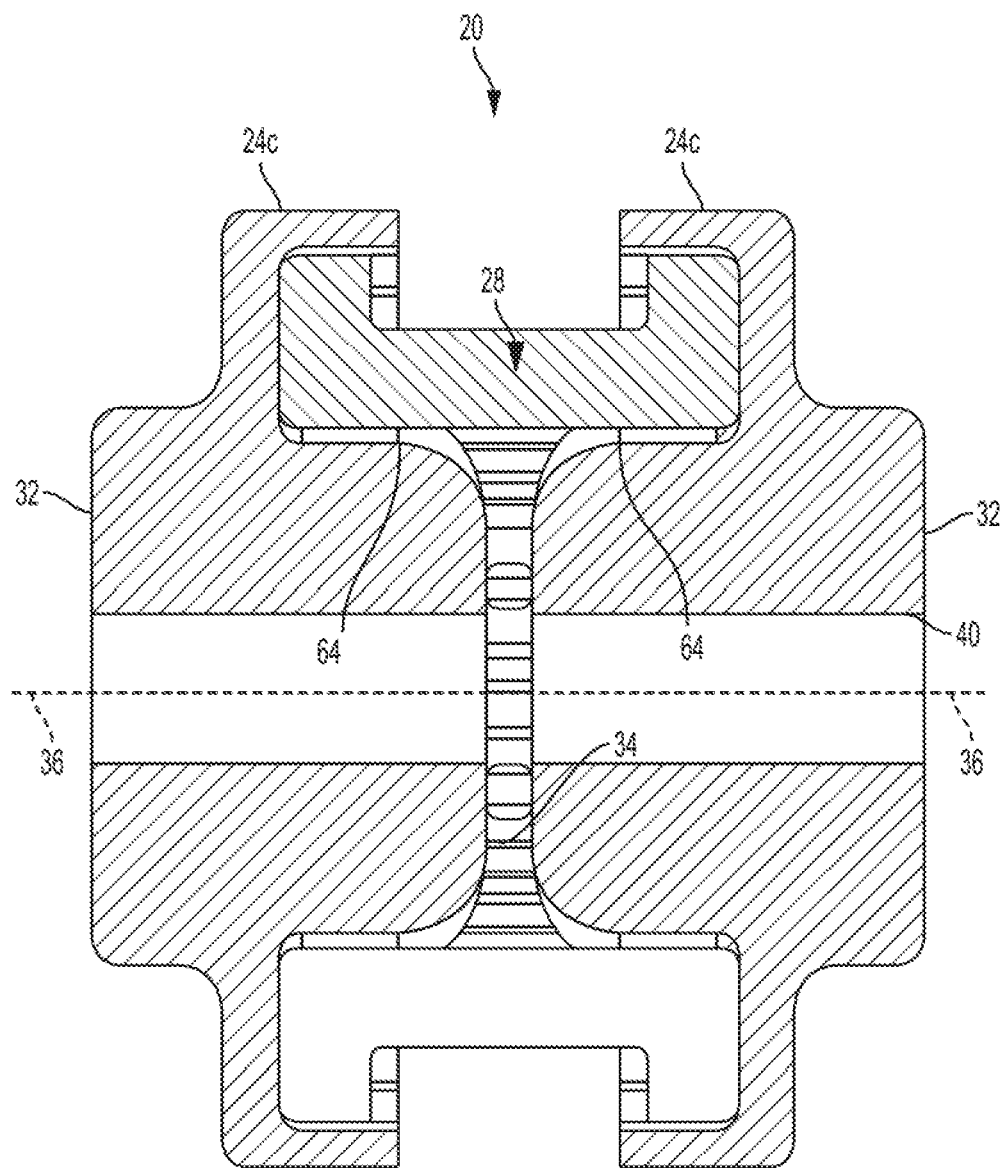
FIG. 10 is a cross-sectional view of a flexible coupling assembly with the flange of FIG. 8.

In another aspect, for instance, the embodiments of the flange 42*b*,42*c* as shown FIGS. 5-10, there may be a transition point 64 at a position on the hub intermediate of the internal face 50 and the axial inward face 44. By way of example, and not in any limiting way, the grooves 54 of the center hub may be shaped such that the diameter of the crests 56 at a position on the hub adjacent to the internal face 50 is greater than a diameter of the crests at transition point 64 on the hub intermediate of the internal face 50 and the axial inward face 44, and the diameter of the crests on the hub at the transition point intermediate of the internal face and the axial inward face is greater than a diameter of the crests at a position on the hub adjacent to the axial inward face. As a further example, the grooves 54 of the center hub 42*b*,42*c* may be shaped with a first rate of change of the diameter of the crests from a position on the hub adjacent to the internal face 50 to the transition point 64 on the hub intermediate of the internal face and the axial inward face, and a second rate of change of the diameter of the crests from the transition point on the hub intermediate of the internal face and the axial inward face to a position on the hub adjacent to the axial inward face. The second rate of change in the diameter of the crests may be greater than the first rate of change in the diameter of the crests. The first and/or the second rate of change in the diameters of the crests may be constant or may be curvilinear. In the example shown in FIGS. 5-7, the rates of change are constant and have taper angles 66,68, but the second rate of change of the diameter of the crests (e.g., taper angle '68') is a greater linear rate than the first rate of change of the diameter of the crests (e.g., taper angle '66'). Thus, in the example of FIG. 5-7, the grooves 54 of the center hub 42*b* are shaped with a double taper angle with the first taper angle 66 provided from a position on the hub adjacent to the internal face 50 to the transition point 64 on the hub intermediate of the internal face and the axial inward face, and a second, greater taper angle 68 from the transition point 64 on the hub intermediate of the internal face and the axial inward face to a position on the hub adjacent to the axial inward face. By way of example, the first taper 66 angle may be about 1/2 degrees and the second taper angle 68 may be about 5 degrees. Thus, in the example shown in FIGS. 5-7, the grooves 54 with the second taper angle 68 replace the second, stepped-down diameter, un-grooved portion 206 of the center hub of FIGS. 11-12. In another aspect, for instance, the embodiment of the flange as shown in FIGS. 8-10, the first rate of change may be constant or linear and the second rate of change may be curvilinear. Thus, in the example of FIG. 8-10, the grooves 54 of the center hub 42*c* may be shaped with the first taper angle 66 provided from a position on the hub adjacent to the internal face 50 to the transition point 64 on the hub intermediate of the internal face and the axial inward face. Additionally, the grooves 54 of the center hub 42*c* may be shaped with a curve 70 beginning at the transition point 64 on the hub intermediate of the internal face 50 and the axial inward face 44 and ending at the axial inward face. The shape of the curve may be a radius. The shape of the curve may be such that the crests 56 and roots 58 of the grooves 64 converge as the profile smoothly transitions to the axial inward face 44. The curve 70 may be parabolic or a full radius. Thus, in the example shown in FIGS. 8-10, the grooves 54 with the curvilinear shape 70 replace the second, stepped-down diameter un-grooved portion 206 of the center hub of FIGS. 2-3. The designs shown in FIGS. 6-10 also eliminate stress concentration points found in the second, stepped-down diameter un-grooved portion 206 design of FIGS. 11-12, and contribute to simpler punch press operations compared to the second, stepped-down diameter un-grooved portion 206 design of FIGS. 11-12.

Figure 13:
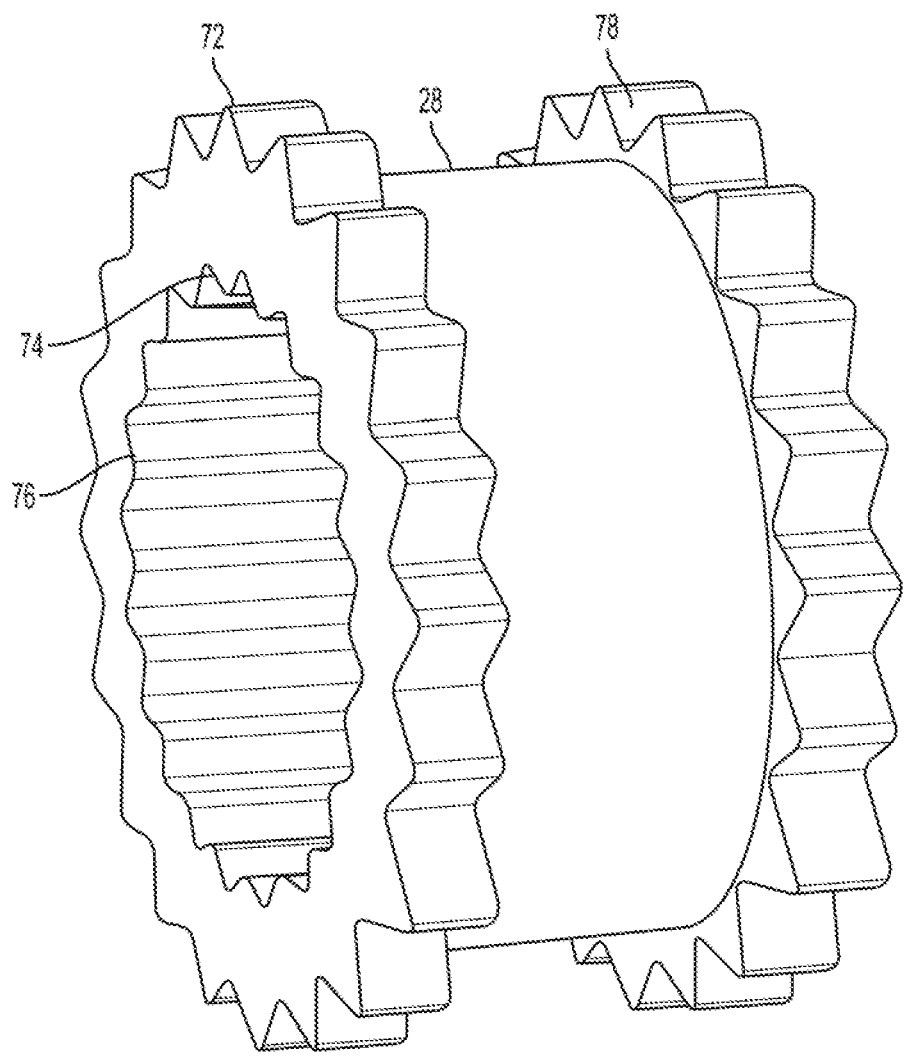
FIG. 13 is a perspective view of the flexible insert of FIG. 1.

Referring to FIG. 13, the flexible element 28 comprises a resilient member with an outer surface 72 and an inner surface 74. Notches 76 are formed on the flexible element inner surface 74 and receive the grooves 54 of the flange center hub. The flexible element 28 may have ridges 78 on its outer surface that are received in the grooves 52 of the flange outer bore wall 46. While the drawings show the grooves of the outer bore wall and center hub as a plurality of similarly shaped, undulating teeth, and the ridges and notches of the flexible element with complementary shapes, other shapes and spacings may be used. Also, it should be appreciated that the number of grooves of the outer bore wall and center hub, and the number of the ridges and notches of the flexible element may be varied in accordance with the application, including the size of the shaft, the size of the flanges, the coupling diameter, and torque requirements of the application.

The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A flexible coupling assembly for connecting two shafts in a coaxial alignment comprising:
   a flange having an interior and an exterior, the flange interior having an internal face and a center hub extending axially from the internal face, the center hub having axially opposite first and second ends and a plurality of radial grooves angularly spaced about a periphery of the hub, the radial grooves having crests and roots, the radial grooves extending axially along a length of the hub and being shaped in a manner such that a diameter of the crests at a position on the hub adjacent to the first axial end of the hub is greater than a diameter of the crests at a position on the hub adjacent to the second axial end; and
   a flexible insert comprising a resilient member having an inner surface and an outer surface, the flexible insert inner surface having a plurality of notches adapted to cooperate with and be received by the plurality of radial grooves, the plurality of notches being further adapted to transmit torque between the flange and the flexible insert.

2. The flexible coupling assembly of claim 1, wherein the radial grooves are shaped in a manner such that grooves have a first angle of taper from a position on the hub adjacent to the first axial end of the hub to a position on the hub intermediate of the first and second axial ends of the hub, and a second angle of taper from the intermediate position to a position on the hub adjacent to the second axial end of the hub, and the second angle of taper is greater than the first angle of taper.

3. The flexible coupling assembly of claim 1, wherein the radial grooves are shaped in a manner such that the grooves have a constant angle of taper from a position on the hub adjacent to the first axial end of the hub to a position on the hub adjacent to the second axial end of the hub.

4. The flexible coupling assembly of claim 1, wherein the radial grooves are shaped in a manner such that the grooves are tapered from a position on the hub adjacent to the first axial end of the hub to a position on the hub intermediate of the first and second axial ends of the hub, and curved from the intermediate position to a position on the hub adjacent to the second axial end of the hub.

5. The flexible coupling assembly of claim 1, wherein the flange comprises a sintered powder metal material.

6. A flexible coupling assembly for connecting two shafts in a coaxial alignment comprising:
   a flange configured to be operatively connected to an end of one of the shafts, the flange having an interior and exterior, the flange interior having an internal face and a center hub extending axially from the internal face, the center hub having an axial inward face that is spaced from the internal face, the hub having a plurality of radial grooves spaced around a periphery of the hub, the radial grooves extending axially along the hub, the grooves being defined by crests and roots, the crests at a position on the hub adjacent to the flange internal face having a diameter greater than a diameter of the crests at a position on the hub adjacent to the hub axial inward face; and
   a flexible insert configured to be mounted to each flange abutting the flange internal face, the flexible insert comprising a resilient member having an inner surface and an outer surface, the flexible insert inner surface having a plurality of notches adapted to cooperate with and be received by the plurality of radial grooves, the plurality of notches being further adapted to transmit torque between the flange and the flexible insert.

7. The flexible couple assembly of claim 6 wherein a diameter of the crests changes at a constant rate from a position on the hub adjacent to the internal face to a position on the hub adjacent to the axial inward face.

8. The flexible coupling assembly of claim 6 wherein a diameter of the crests changes at a first constant rate from a position on the hub adjacent to the internal face to a position on the hub between the internal face and axial inward face.

9. The flexible coupling assembly of claim 8 wherein a diameter of the crests changes at a second constant rate from the position on the hub between the internal face and axial inward face to a position on the hub adjacent to the hub axial inward face.

10. The flexible coupling assembly of claim 9 wherein the second constant rate is greater than the first constant rate.

11. The flexible couple assembly of claim 8 wherein a diameter of the crests changes in a curvilinear manner from the position on the hub between the internal face and the axial inward face to a position on the hub adjacent to the hub axial inward face.

12. The flexible coupling assembly of claim 8 wherein a diameter of the crests changes in a radius manner from the position on the hub between the internal face and the axial inward face to a position on the hub adjacent to the hub axial inward face.

13. The flexible coupling assembly of claim 6 wherein the flange comprises a sintered powder metal material.

14. A flexible coupling assembly for connecting two shafts in a coaxial alignment comprising:
   a flange configured to be operatively connected to an end of one of the shafts, the flange having an interior and exterior, the flange interior having an internal face and a center hub extending axially from the internal face, the center hub having an axial inward face that is spaced from the internal face, the center hub having a proximal end adjacent to the flange internal face and a distal end adjacent to the axial inward face, the hub having a plurality of radial grooves angularly spaced around a periphery of the hub, the radial grooves extending axially from the hub proximal end to the hub distal end, the radial grooves being defined by crests and roots, the crests at the hub proximal end having a diameter greater than a diameter of the crests at the hub distal end; and
   a flexible insert configured to be mounted within the interior of each flange, the flexible insert comprising a resilient member having an inner surface and an outer surface, the resilient member inner surface having a plurality of notches adapted to cooperate with and be received by the plurality of radial grooves, the plurality of notches being further adapted to transmit torque between the flange and the flexible insert.

15. The flexible coupling assembly of claim 14 wherein a diameter of the crests of the grooves of the hub changes at a constant rate from the hub proximal end to the hub distal end.

16. The flexible coupling assembly of claim 14 wherein a diameter of the crests at the hub proximal end is greater than a diameter of the crests at a position intermediate of the hub proximal end and the hub distal end.

17. The flexible coupling assembly of claim 16 wherein a diameter of the crests at the position intermediate of the hub proximal end and the hub distal end is greater than a diameter of the crests at the hub distal end.

18. The flexible coupling assembly of claim 17 wherein the diameter of the crests at the position intermediate of the hub proximal end and the hub distal end changes at a constant rate from the position intermediate of the hub proximal end and the hub distal end to the hub distal end.

19. The flexible coupling assembly of claim 17 wherein the diameter of the crests at the position intermediate of the hub proximal end and the hub distal end changes in a curvilinear manner from the position intermediate of the hub proximal end and the hub distal end to the hub distal end.

20. The flexible coupling assembly of claim 17 wherein the diameter of the crests at the position intermediate of the hub proximal end and the hub distal end changes in a radius manner from the position intermediate of the hub proximal end and the hub distal end to the hub distal end.

\* \* \* \* \*